United States Patent
Sanders et al.

(10) Patent No.: US 10,167,925 B2
(45) Date of Patent: *Jan. 1, 2019

(54) STUB SHAFT FOR CONNECTION WITH A FLYWHEEL ROTOR

(71) Applicant: Amber Kinetics, Inc., Fremont, CA (US)

(72) Inventors: Seth Sanders, Berkeley, CA (US); Eric Sun, Union City, CA (US); Mike He, San Jose, CA (US); Matthew Senesky, Berkeley, CA (US); Edward Young Chiao, San Jose, CA (US)

(73) Assignee: Amber Kinetics, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/811,012

(22) Filed: Jul. 28, 2015

(65) Prior Publication Data
US 2016/0061289 A1    Mar. 3, 2016

Related U.S. Application Data

(63) Continuation-in-part of application No. 14/469,382, filed on Aug. 26, 2014.

(51) Int. Cl.
*F16F 15/30*    (2006.01)

(52) U.S. Cl.
CPC ............. *F16F 15/30* (2013.01); *Y02E 60/16* (2013.01)

(58) Field of Classification Search
CPC ....... F16F 15/315; F16F 15/3153; F16F 15/30
See application file for complete search history.

(56) References Cited

U.S. PATENT DOCUMENTS

| | | | |
|---|---|---|---|
| 3,436,572 A | * | 4/1969 | Storsand ............... F16F 15/315 |
| | | | 310/165 |
| 3,496,799 A | | 2/1970 | Call |
| 3,608,014 A | | 9/1971 | Balchan et al. |
| 3,752,216 A | | 8/1973 | Fritsche |
| 4,179,951 A | | 12/1979 | Theyse |
| 4,408,500 A | | 10/1983 | Kulkarni et al. |
| 4,688,419 A | | 8/1987 | D'Angelo et al. |
| 5,866,066 A | | 2/1999 | Hemphill et al. |
| 6,710,489 B1 | | 3/2004 | Gabrys |
| 6,825,588 B2 | | 11/2004 | Gabrys et al. |
| 2004/0256929 A1 | | 12/2004 | Gabrys et al. |
| 2006/0048576 A1 | | 3/2006 | Kiuchi et al. |
| 2011/0215592 A1 | | 9/2011 | Ishikawa et al. |

(Continued)

FOREIGN PATENT DOCUMENTS

| | | |
|---|---|---|
| CN | 1247139 | 3/2000 |
| CN | 2389047 Y | 7/2000 |

(Continued)

OTHER PUBLICATIONS

DE 2754623 Translation, 4 pages.*

(Continued)

*Primary Examiner* — Vicky A Johnson
(74) *Attorney, Agent, or Firm* — Fenwick & West LLP (57) ABSTRACT

An energy storage system including a solid steel flywheel rotor, journals, and separate stub shafts for connecting to the journals has improved material properties offers improved energy storage at reduced cost.

23 Claims, 5 Drawing Sheets

(56) References Cited

U.S. PATENT DOCUMENTS

| | | | |
|---|---|---|---|
| 2014/0103760 A1 | 4/2014 | Dugas | |
| 2015/0013148 A1 | 1/2015 | Dharan | |
| 2016/0061289 A1 | 3/2016 | Sanders et al. | |
| 2018/0003263 A1* | 1/2018 | Sanders | H02K 7/025 |

FOREIGN PATENT DOCUMENTS

| | | | |
|---|---|---|---|
| CN | 201523280 U | 7/2010 | |
| DE | 251865 C | 11/1912 | |
| DE | 2754623 A1 * | 6/1979 | F16F 15/3153 |
| DE | 10343735 A1 | 5/2004 | |
| EP | 2492528 A1 | 8/2012 | |
| FR | 975009 A * | 2/1951 | F16F 15/315 |
| TW | 201400725 A | 1/2014 | |
| TW | 201616788 A | 5/2016 | |
| WO | WO 02/03523 A2 | 1/2002 | |
| WO | WO 2015/006136 A2 | 1/2015 | |

OTHER PUBLICATIONS

PCT International Search Report and Written Opinion for PCT/US15/45545, dated Nov. 23, 2015, 21 Pages.
Office Action from for ROC (Taiwan) Patent Application No. TW 104127724, dated Jun. 1, 2016, 12 Pages.
Office Action for U.S. Appl. No. 14/469,382, dated Nov. 23, 2016, 10 Pages.
Office Action for U.S. Appl. No. 14/469,382, dated Aug. 11, 2016, 14 Pages.
Office Action for U.S. Appl. No. 14/469,382, dated Jul. 13, 2017, 15 Pages.
PCT International Search Report for Written Opinion for PCT/US2017/049428, dated Nov. 20, 2017, 13 Pages.
First Office Action for Chinese Patent Application No. CN 201580045758.X, dated Apr. 24, 2018, 17 Pages.
Extended European Search Report for European Patent Application No. EP 15835832.5, dated Apr. 12, 2018, 14 Pages.
Office Action for Canadian Patent Application No. CA 2,958,926, dated Mar. 12, 2018, 5 Pages.

* cited by examiner

STUB SHAFT FOR CONNECTION WITH A FLYWHEEL ROTOR

CROSS REFERENCE TO RELATED APPLICATIONS

This application is a continuation-in-part of co-pending U.S. application Ser. No. 14/469,382, filed Aug. 26, 2014, which is incorporated by reference in its entirety.

GOVERNMENT RIGHTS LEGEND

This invention was made with government support under contract OE-0000232 awarded by the U.S. Department of Energy. The government has certain rights in the invention.

BACKGROUND

1. Field of Art

This description generally relates to energy storage, and particularly to energy storage using flywheels.

2. Description of the Related Art

Many energy sources, particularly clean energy sources such as wind turbines and solar panels, generate energy that does not temporally match the load experienced. In much of the developed world, energy generation follows experienced load, such that energy is provided as needed. Under circumstances of high load, techniques such as the use of peaker generators and spinning and non-spinning reserves on thermal generators allow for generation that matches high and variable load. However, despite the availability of such techniques, there are often instances where energy storage is important for meeting energy load.

Currently existing energy storage systems all have drawbacks of one form or another. Size, price, storage efficiency, efficacy, and safety are all concerns when designing an energy storage system. Generally, smaller size, lower price, reduced loss in both inputting energy for storage and extracting it for distribution, reduced losses for continuous operation, and safe disposal are all preferred characteristics of energy storage systems.

A flywheel is one type of energy storage system that stores energy as rotational kinetic energy. A flywheel rotor is a weighted, rotationally symmetric mass that spins while physically coupled, directly or indirectly, to a motor/alternator that itself is electrically coupled to a converter, such as a back-to-back inverter system, constituting an AC-AC conversion subsystem. When power is received for storage, the rotor is driven, increasing the rotational speed of the flywheel rotor. When power is to be extracted, the flywheel rotor drives the motor/alternator. The faster a flywheel rotor can spin, the more energy it can store, but the more stress is induced on the rotor. Generally, the amount of stress a rotor is able to sustain while operating is a function of the design, materials, and processes used to make the rotor. Specifically, the amount of stress that can be sustained depends on a combination of the rotor material's yield strength, fracture toughness, maximal intrinsic defect size, cyclic fatigue characteristics, and the rotor's shape, among other factors. Generally, a flywheel's bearing and suspension subsystem is designed to minimize energy losses due to friction, and other loss sources.

Cost relative to the amount of energy that can be stored is of particular importance for a flywheel system. The cost of a flywheel system can be roughly divided into two portions, the cost of manufacturing the flywheel rotor, and the balance of system costs for supporting elements such as bearings, mountings, enclosure, etc. In the past, flywheel rotors have been very expensive to manufacture. As a result, flywheel systems have primarily been used in applications involving only seconds to minutes of energy storage, as it was simply too costly to either manufacture a single rotor that can store tens to hundreds of kWh of energy, or to use many individual rotors that are cost inefficient with respect to the balance of systems costs for the supporting elements used in conjunction with the rotors.

Some existing flywheel rotors are made of common, low alloy steels such as American Iron and Steel Institute (AISI) 4340 and AISI 4140. These steels have low costs and other desirable properties, however such rotors are limited to thin sections due to limitations in through-hardenability, which is required to achieve a useful yield strength and therefore that can handle a significant amount of stress. For example, although these rotor materials can achieve ultimate tensile strengths (UTSs) of 2 gigapascal (GPa), and fracture toughness of 40 megapascal square root meter (MPa·m$^{0.5}$), such rotors are limited to maximum cross-sectional thicknesses of 3-6 inches.

Other steel flywheel rotors are made with high-alloy steels such as maraging steels, Aermet steels, and some stainless steels. These flywheel rotors are able to sustain higher stresses throughout cross-sectional thicknesses greater than 6 inches. These rotors achieve these stresses without the need for multiple separate sections, but are cost prohibitive due to the high content of expensive alloying elements such as nickel and cobalt. Other modern flywheel rotors are made of carbon fiber and therefore allow for significantly higher working stresses, however the high cost of carbon fiber and the ancillary components needed to achieve the corresponding higher rotational speeds makes carbon fiber rotors prohibitively expensive, despite their high working strength-to-weight ratios.

SUMMARY

An energy storage system including a flywheel rotor, journals, and separate stub shafts for connecting to the journals is described. The flywheel rotor is a rotationally symmetric mass made of a single piece of steel. The journals are centered on the center rotational axis of the mass, located on the top and bottom of the mass in an implementation where the mass is oriented upright along the center axis. The two stub shafts are also substantially rotationally symmetric, and are each physically connected to one of the journals.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. Flywheel Energy Storage System

Figure 1:
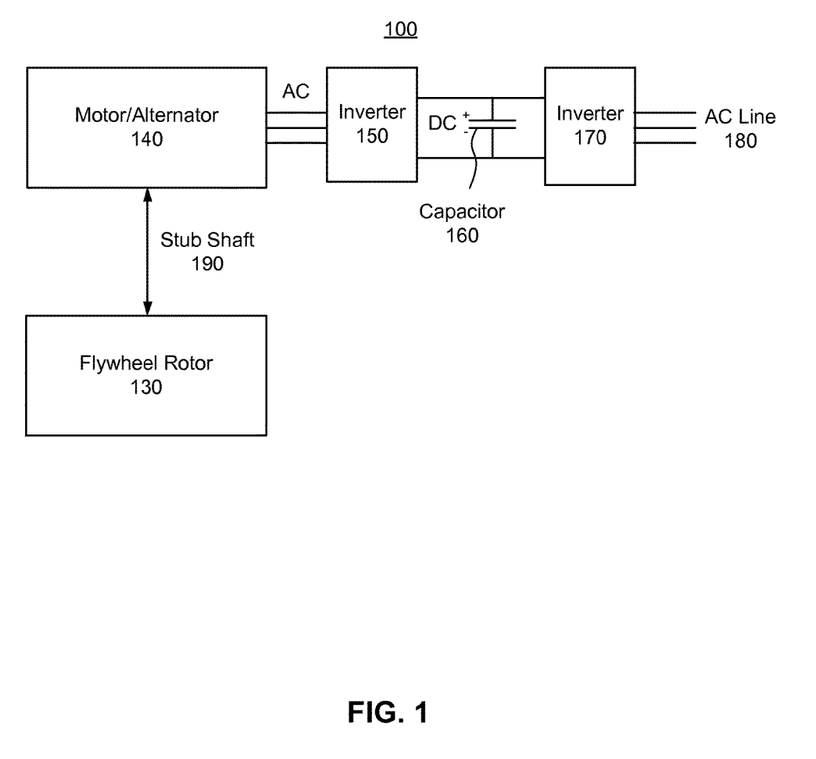
FIG. 1 is a block diagram of a flywheel energy storage system according to one embodiment.

FIG. 1 is a block diagram of a flywheel energy storage system 100 according to one embodiment. The energy storage system includes a flywheel rotor 130, a motor/alternator 140, a first inverter 150, a capacitor 160, a second inverter 170, and an AC line 180. Energy is drawn from, or delivered to, an AC line 180, such as a conventional three-phase 60 Hz line. The first 150 and second 170 inverters as well as capacitor 160 illustrate an exemplary back-to-back converter system for converting the input alternating current into an alternating current acceptable to the motor/alternator 140. The motor/alternator 140 converts between electrical and mechanical energy, so that energy can be stored in or drawn from the flywheel rotor 130. The motor/alternator 140 is physically coupled to the flywheel rotor 130 either directly or indirectly using a stub shaft 190. Magnetic bearing elements may be used (not shown) to help reduce lateral motion, off-axis rotation, and friction in the system. The motor/alternator 140 is coupled to the remainder of the system 100 via wires or other electrical couplings. Generally, although only one of each component is shown, in practice a flywheel energy storage system 100 may include multiples of each individual component. FIG. 1 is one exemplary type of ac-to-ac conversion system. In general, the inventions described herein pertain to a broad range of ac-to-ac conversion topologies, as well as systems that interface directly to a direct current (dc) line. The latter are of especial relevance for dc microgrid and solar photovoltaic applications.

II. Flywheel Rotor Shape

Figure 2:
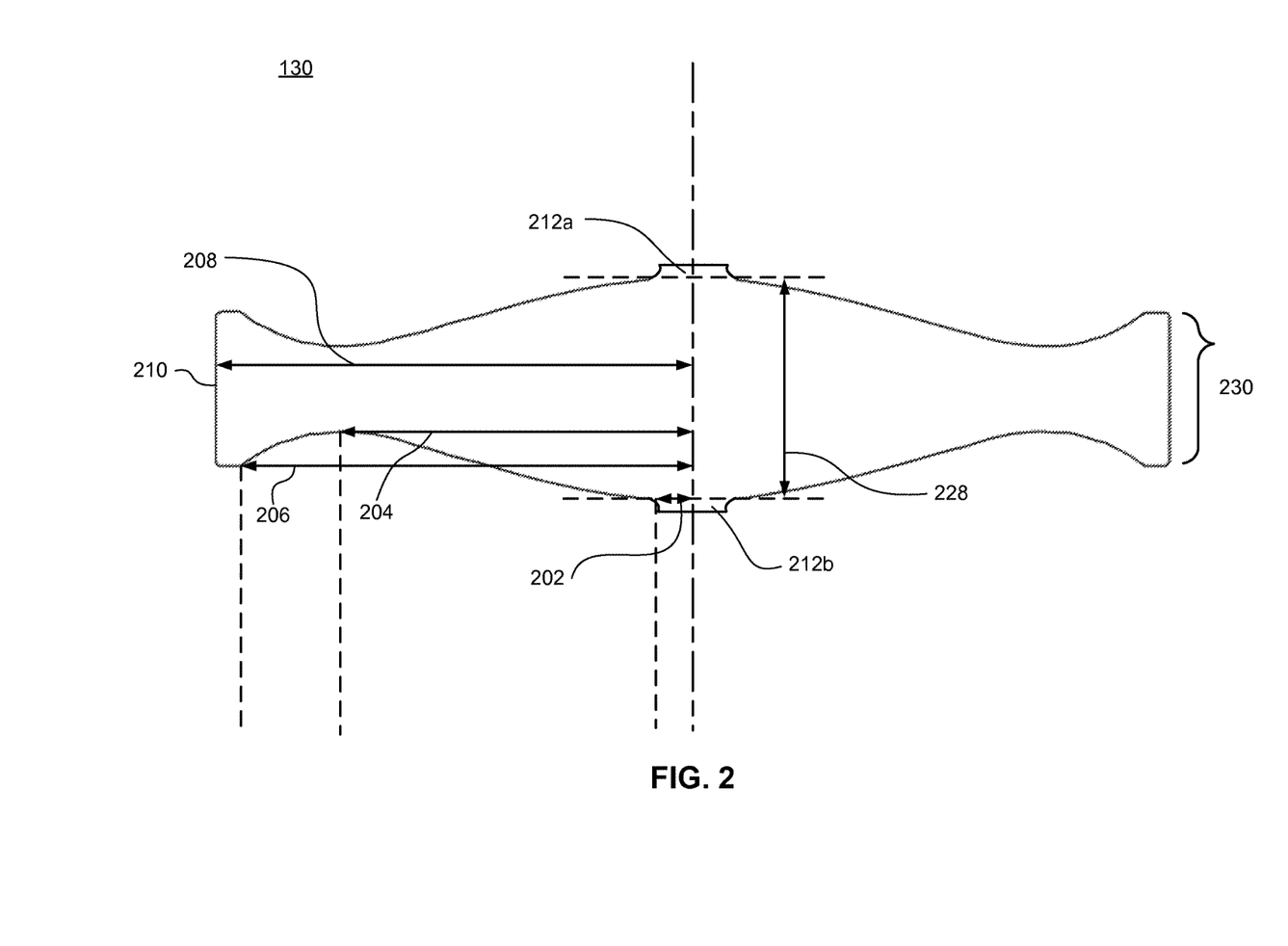
FIG. 2 is a cross sectional view of a flywheel rotor according to one embodiment.

FIG. 2 is a cross sectional view of a flywheel rotor 130 (or simply rotor) according to one embodiment. The rotor 130 is formed of a single mass of material. However, two different portions of the rotor 130 generally can be said to perform different functions. A primary rotational mass 230 makes up most of the mass of the rotor and stores the majority of the kinetic energy stored by the rotor. Two journals 212 extend perpendicularly from either side of the primary rotational mass and assist in coupling the rotor to separate shafts (not shown). Each of these portions is further described below. In some instances, the rotor may also include elements on its outer surface, for example discrete masses to provide centrifugal loading.

The rotor is generally rotationally symmetric, and thus the rotor can be described using a cylindrical coordinate system where the origin is through the center rotational axis of the rotor. In implementations including other elements on the outer surface, such as discrete masses, the rotor and the discrete mass elements are both uniformly distributed about the origin To provide an example of scale, in one embodiment, the rotor 130 is between 36-72 inches in diameter, and weighs between 2-5 tons.

II.A Primary Rotational Mass

Beyond being rotationally symmetric, the primary rotational mass may be formed in a variety of different shapes, each designed to achieve specific performance goals. In one implementation, the primary rotational mass 230 of the rotor has a "fishtail" shape, when viewed in cross-section.

The fishtail shape helps ensure a nearly uniform distribution of stress throughout the primary rotational mass 230 due to rotational forces exerted on the rotor. The fishtail shape is an exemplary shape for optimizing rotor mass and material volume utilization, i.e. for optimizing the shape factor. Generally, the fishtail shape includes a center section and an adjoining peripheral mass. In the center section, the rotor is thicker closer to a first radius 202 near the center axis 226, and continuously decreases in thickness out to a second radius 204, away from the origin. In one embodiment, this central section is governed by a profile of the form:

$$t = he^{-\beta r^2} \quad (1)$$

where t is the longitudinal thickness of the rotor, h is the central thickness, r is the distance away from the origin along the polar axis, and β is a constant.

Regarding the peripheral mass's shape, between the second radius 204 and a third radius 206 near the outer diameter 210 of the rotor, the primary rotational mass 230 continuously increases in thickness in the longitudinal axis. Between the third radius 206 and a fourth radius 208, the rotor maintains a consistent thickness in the longitudinal axis for a short distance along the polar axis. The fourth radius 208 is located at or near the outer surface 210 of the rotor along the polar axis. Near the fourth radius 208, the rotor's edges may be rounded or squared.

Regarding the relative proportions of the center section relative to the peripheral mass, the majority of the mass of the fishtail portion is located in the center section.

In the example illustrated in FIG. 2, the outer surface 210 of the rotor 130 has a diameter that is greater than the widest thickness 228 of the fishtail portion of the rotor 130. As will be further described below, any shape of rotor that allows the entirety of the rotor to be through-hardened is capable of achieving relatively high levels of working stress. Generally, rotors with diameters greater than their thickness rotate at slower speeds than their counterparts with thicknesses greater than their diameter. Slower rotational speeds reduce the operational requirements of the bearing assembly that allows the rotor to rotate, thereby reducing the overall cost of the flywheel system.

In another embodiment, rather than having the fishtail shape, the rotor instead has a cylindrical shape.

II.B Journals and Stub Shafts

Along the longitudinal axis (or center rotational axis) of the rotor, the rotor includes two journals 212 for attaching and detaching two shafts for transferring energy between the rotor and the bidirectional motor/alternator 140. The journals 212 remove the need for a bore to couple the rotor to the shaft. A bore results in a doubling of hoop stress at the inner diameter of the bore. Such bores are often drilled into rotors after manufacturing of the rotor, or the rotors are deliberately designed and manufactured with such a hole in mind. In contrast, replacing a bore with the journals 212 allows stress to be more evenly distributed throughout the primary rotational mass, thereby avoiding a stress riser where the bore would otherwise be placed.

Figure 3:
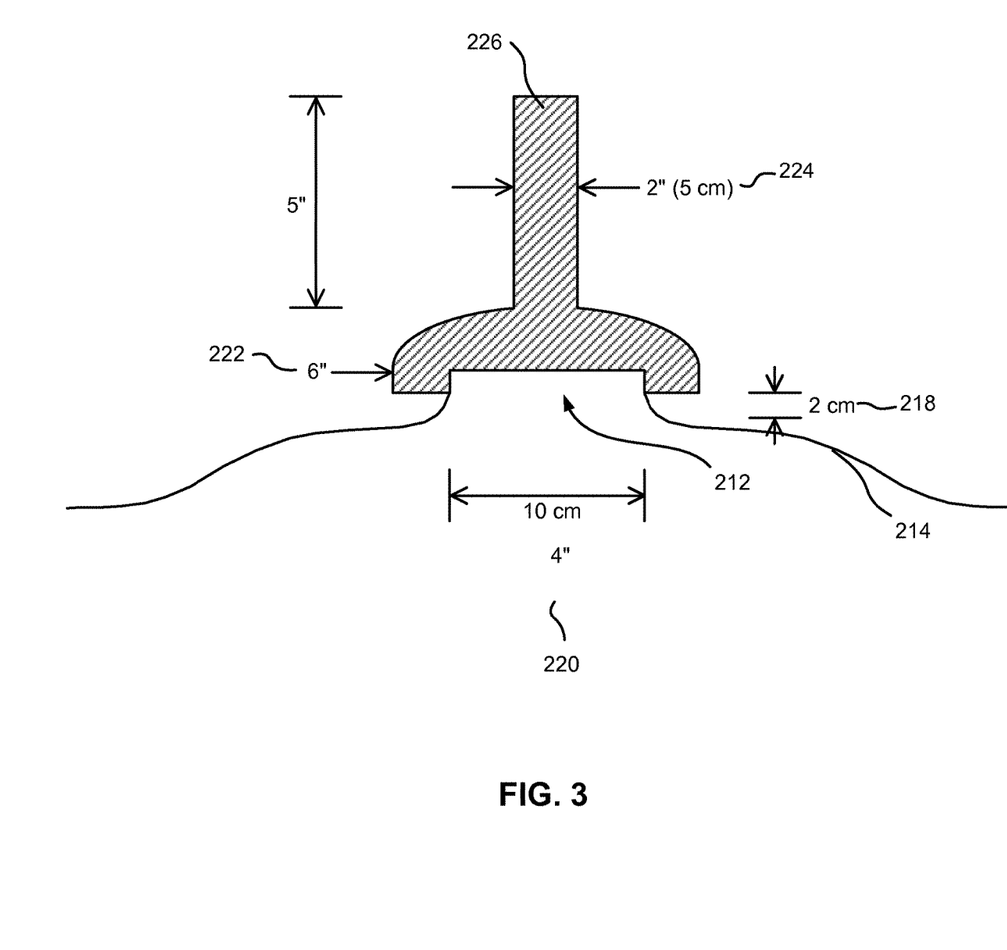
FIG. 3 is a cross sectional view of a journal of a flywheel rotor and a connected stub shaft according to one embodiment.

FIG. 3 is a cross sectional view of a journal 212 of the rotor and a connected stub shaft according to one embodiment. Each journal 212 extends outward 218 along the longitudinal axis of the mass from a mound 214 of increased thickness that itself extends outward from the origin of the center section of the primary rotational mass 230. The mound 214 has a tapered shape that has a thickness greatest adjacent to the journal 212, and which tapers gradually in thickness as radius increases. The gradually tapering shape of the mound 214 isolates the journal from experiencing a stress riser or peak stress at the point where the journal 212 adjoins the primary rotational mass 230.

A fillet is present where the journal 212 and mound 214 are joined. The fillet avoids stress risers around the journal 212. The journal's outer/top surface is substantially planar, and perpendicular to the polar axis. The outer surface of journal 212 is narrower 220 than a connecting end 222 of the shaft 226 configured to attach to the journal 212. The stub shaft then narrows to a narrower outer diameter 224 for the majority of its length. The total length of the stub shaft may vary by implementation. The shaft may also include its own fillet (not shown) to more evenly distribute bending stress at the junction between the narrow 224 portion of the shaft and the connecting end 222 of the shaft.

Generally, the diameter 220 where the interference fit is located at the boundary between the outer diameter of the journal 212 and the inner diameter of the connecting end 222 of the stub shaft is greater than the diameter 224 of the majority of the length of the stub shaft. Having a comparatively large diameter 220 for an interference fit is beneficial for further reducing stress risers inside the rotor 130 near the journal 212, since only a relatively light interference fit is needed with such a large diameter. Further, the interference stresses induced in the journal region are generally compressive, and thus work to mitigate centrifugally induced stresses in the journal 212. Thus, the combination of the tapering shape and wide diameter 220 of the journal 212 result in a mechanism for coupling with the shaft that minimizes the stress impact of the coupling on the rotor 130 as a whole.

In one embodiment, the shaft 226 is coupled to the journal 212 via a shrink fit. For example, the shaft can be heated prior to attachment to the journal 212, causing the shaft to thermally expand. After heating, the journal 212 and shaft can be attached. The shaft is then allowed to cool, thereby thermally contracting to create an interference fit with the journal 212. In another embodiment, an internal press fit may be used, with cooling of the shaft used to create the interference fit between the journal 212 and the shaft 226. The shaft 226 may also be coupled to the journal 212 via a press fit, or with a central axially oriented retaining bolt if a hollow cylindrical shaft is used. These are examples of numerous alternatives for coupling the shaft 226 to the journal 212.

As an example, in one embodiment the journal 212 has an outer diameter of approximately 3-8 inches, and protrudes outward from the mound a distance between 0.5 to 2 inches, inclusive. The shaft has a connecting end 222 outer diameter of between 4-10 inches, inclusive, and an inner diameter designed to match (via interference fit) the outer diameter of the journal (e.g., approximately to 3-8 inches). The interference fit is on the order of thousandths or hundredths of inches (e.g., 2-10 thousands of an inch). That is, although the example diameters of both the outer diameter of the journal 212 and the inner diameter of the shaft are both listed listed as being 3-8 inches, in practice their diameters will differ from each other by an amount based on the closeness of the interference fit (e.g., both 4 inches with one being 0.0003 inches larger or smaller than the other). Away from the connecting end, the shaft has an outer diameter 224 of between 1-3 inches, inclusive, which is narrower than the outer diameter of the journal 212.

In practice, there is no upper limit on the diameter of the journal 212 (and associated inner diameter of connecting end 222 of the shaft), as larger diameters perform better. However, there are costs and difficulties associated with manufacturing a shaft that meets the side load requirements set forth below. Generally, the larger the diameter of the journal 212, the less material needs to be removed from the rotor mass during manufacturing which lowers the cost of manufacturing. However, forming a shaft 226 with a large connecting end 222 and a narrow radius 224 does require removal of additional material from a larger starting block for the shaft, which adds to the cost of manufacturing. Further, a large connecting end 222 is unwieldly, and may make construction of a flywheel system including the rotor and shafts more complex.

The journal 212 extends outward 218 from the rotor only a short distance. Although a larger distance 218 outward would result in a better interference fit and better compressive stress on the rotor, it is not necessarily possible to extend distance 218 while still achieving the performance characteristics for the rotor as set forth herein. The reason for this is that the further the journal extends outward, the larger the starting block of material the rotor must be, and the more material must be removed from the starting rotor mass to arrive at the final rotor shape, both of which add to the cost of manufacturing the rotor. Further, as is described below with respect to FIG. 4, the starting block of rotor material may undergo a number of treatments to affect its properties (strength, etc.) before the rotor is machined into its final shape. One such treatment is a hardening, where there is an upper limit as to how far into a mass a material may be hardened. If the mass is thicker than this upper limit, it is not possible to through-harden the entire mass of material. Consequently, it is not always possible to start with a larger block of material in order to extend the journal 212 outward 218 further, and also through-harden the entire rotor mass.

The shafts 226 are designed to withstand a significant side load. These bending stresses are highest near the connecting end 222. Generally, the rotor will be operated to rotate about an axis parallel to Earth's gravity. However, the shafts 226 are designed such that if the rotor were tipped or if the rotor were operated to rotate about an axis perpendicular to Earth's gravity, the rotor would still be fully operational. In one embodiment, the shafts 226 are designed to handle a 1 G (9.80665 meters per second squared) side load without deformation or failure. In one example of this embodiment, the peak bending stress on the shaft 226 under a 1 G side load is 170 MPa, and the yield/ultimate tensile strength of between 500 MPa-1.5 GPa. An example of an alloy that can be manufactured to meet these standards is AISI 4340, though other alloys can meet these standards as well.

Figure 5:
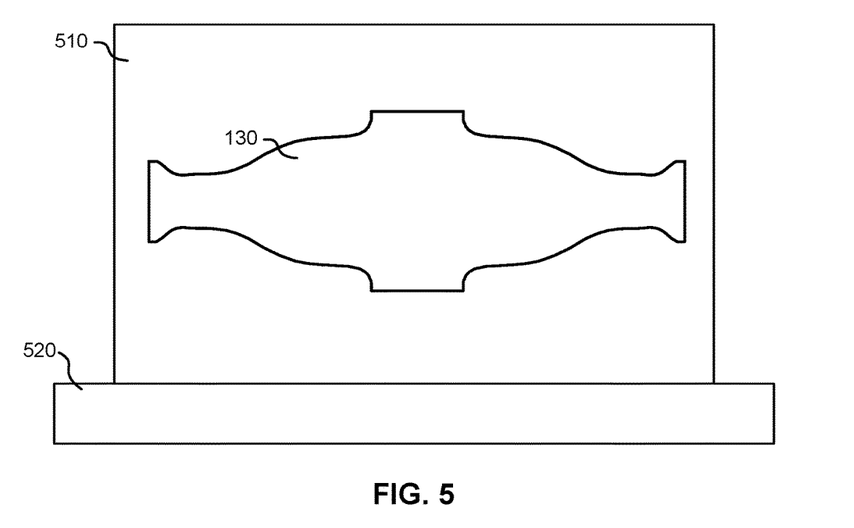
FIG. 5 is a block diagram showing a flywheel rotor located within a housing that is isolated from the earth by a footing, according to one embodiment.

In addition to meeting material strength constraints under load, the shaft length and diameter can be designed to effect a chosen bending stiffness. In one embodiment, this chosen bending stiffness is between 25-200 Newtons per micron (N/μm) (e.g., 70 N/μm), with stiffness referred to sideloading at the end of the shaft, resulting in a lateral center of mass frequency of between 20-60 hertz (Hz). This bending stiffness can be chosen to set lateral and torsional compliances, so as to set lateral and torsional resonant modes of the flywheel rotor suspension subsystem. This compliant subsystem effectively joins the rigid body rotor to the typically rigid housing 510. The housing 510 may be anchored to the earth, or, in turn, may be isolated from the earth by a secondary suspension, typically a footing 520. In general, the resonant modes are simply determined at zero speed, and then translate to lateral center-of-mass and whirl modes, as rotor speed increases speed above zero.

The rotor, including the primary rotational mass 230 and journals 212, is manufactured as a single piece of material, for example using the example materials and example process described below. Thus, the rotor has a single body construction where there are no welds, joints, seams, holes, or differences in construction between the primary rotational mass and journals 212. However, also as further described below, different portions of the single body/single piece rotor may be subjected to different treatments and/or manufacturing processes to vary the properties of the rotor at different points. For example, the surface of the rotor may receive different treatments than the interior of the rotor.

III. Rotor Material Properties and Manufacturing.

The performance of the rotor is based on several parameters of the materials that make up the rotor, as well as the manufacturing processes performed to convert the raw materials into the final state as they appear in the rotor. These parameters include the yield strength of the rotor, the fracture toughness of the rotor, the maximal intrinsic defect size (or maximum initial crack size) in the rotor, and the cyclic fatigue (or cyclic crack growth rate). The rotor may also be described in terms of other properties that are either known equivalents of these properties or that can be converted into/derived from these properties.

In one embodiment, the rotor has parameter values such that the yield strength $\sigma_{yield}$ of the rotor is greater than a first threshold, the fracture toughness $\sigma_{fracture}$ of the rotor is greater than a second threshold, and the maximal intrinsic defect size $\alpha_{intr}$ is less than a threshold size. Defined in this way the rotor achieves significant performance in the working stress $\sigma_{working}$ it can endure over its operational lifetime. During the operation the rotor will always meet the following condition:

$$\sigma_{working} < \alpha \sigma_{yield} \quad (1)$$

where $\alpha$ is a parameter for derating between 0 and 1. Further, the rotor material is designed such that during the operational lifetime of the rotor, the cyclic crack growth, or growth of an initial crack present in the rotor during manufacturing as it grows towards the critical crack size, grows slowly enough to permit tens of thousands of complete stress cycles.

As a specific example, in one embodiment the rotor has a yield strength $\sigma_{yield}$ of at least 900 MPa, a fracture toughness $\sigma_{fracture}$ of at least 70 megapascal per square root meter (MPa·m$^{0.5}$), and a maximal intrinsic defect size that is 2 millimeters (mm) or smaller. In another embodiment, the rotor has a yield strength $\sigma_{yield}$ between 900 MPa and 2 GPa, inclusive, a fracture toughness $\sigma_{fracture}$ between 40 and 200 MPa·m$^{0.5}$, inclusive, and a maximal intrinsic defect size between 0.05 mm and 2 mm, inclusive. In other embodiments, the rotor may have properties within any sub-range within the above described ranges. For example, in one embodiment, the rotor has a yield strength $\sigma_{yield}$ of between 900-1000 MPa, 1000-1100 MPa, 1100-1200 MPa, 1200-1300 MPa, 1300-1400 MPa, 1400-1500 MPa, 1500-1600 MPa, 1600-1700 MPa, 1700-1800 MPa, 1800-1900 MPa, 1900-2000 MPa, or any combination of sub-ranges thereof. In the same or a different embodiment, the rotor has a fracture toughness $\sigma_{fracture}$ of between 40-50 MPa·m$^{0.5}$, 50-60 MPa·m$^{0.5}$, 60-70 MPa·m$^{0.5}$, 70-80 MPa·m$^{0.5}$, 80-90 MPa·m$^{0.5}$, 90-100 MPa·m$^{0.5}$, 100-110 MPa·m$^{0.5}$, 110-120 MPa·m$^{0.5}$, 120-130 MPa·m$^{0.5}$, 130-140 MPa·m$^{0.5}$, 140-150 MPa·m$^{0.5}$, 150-160 MPa·m$^{0.5}$, 160-170 MPa·m$^{0.5}$, 170-180 MPa·m$^{0.5}$, 180-190 MPa·m$^{0.5}$, 190-200 MPa·m$^{0.5}$, or any combination of sub-ranges thereof. In the same or a different embodiment, the rotor has a maximal intrinsic defect size of between 0.5-0.6 mm, 0.6-0.7 mm, 0.7-0.8 mm, 0.8-0.9 mm, 0.9-1.0 mm, 1.0-1.1 mm. 1.1-1.2 mm, 1.2-1.3 mm, 1.3-1.4 mm, 1.4-1.5 mm, 1.5-1.6 mm, 1.6-1.7 mm, 1.7-1.8 mm, 1.8-1.9 mm, 1.9-2.0 mm, or any combination of sub-ranges thereof.

A rotor that meets the above exemplary thresholds can be made of 300M steel. 300M steel is described by Aerospace Material Standard (AMS) Society of Automotive Engineers (SAE) 6257 (referred to simply as SAE-6257). 300M steel has a proportional chemical composition of 1.6% Silicon (Si), 0.82% Chromium (Cr), 1.8% Nickel (Ni), 0.40% Molybdenum (Mo), 0.08% Vanadium (V), and a range of 0.40-0.44% Carbon (C), with remainder being Iron (Fe). 300M steel has a relatively low cost, and thus is advantageous for reducing the cost of a flywheel energy storage system including a rotor made of this material. The V and Si are alloying elements that offer improved hardenability and allow thick-section rotors to be made that are up to 14" thick and entirely through-hardened, for example in the fishtail shape as described above.

However, mere specification of 300M steel alone is insufficient to ensure the parameters specified above. Additional manufacturing steps are used to improve the performance of the rotor. These steps include refining, multi-step forging, heat treatments, surface treatments, and machining.

The 300M steel is refined using a refinement process such as vacuum-arc-remelting ("VAR"), electro-slag-remelting ("ESR"), or vacuum induction melting (VIM). These processes help remove defects larger than the desired maximal intrinsic defect size. In contrast, if the 300M steel were instead melted in open air, it would tend to have defects larger than this desired maximal intrinsic defect size such as inclusions or other impurities. VAR refinement helps ensure that the maximal intrinsic defect size is 2 mm or smaller.

Multi-step forging introduces directional grains into the rotor. Generally, grain orientation is determined based on the forging process used. A single step forging process may be insufficient to ensure the presence of consistent directional grains throughout the entirety of the rotor. Performing multiple forging steps helps ensures consistent grain orientation throughout the entirety of the rotor. Controlling grain orientation also has the added benefit of shaping and orienting any inclusions present in the rotor.

Generally, heat treatments are used to increase yield strength and hardness of steel. In a heat treatment, the steel is heated (or austenetized) into austenite. The time and temperature of the heating in part defines the grain size of the rotor. The austenite is then rapidly cooled (or quenched). The quenching converts the austenite into one of several other material phases of steel, such as pearlite and martensite. Due to the physics of heat transfer, not all depths within the steel will cool at the same rate, meaning that shallower depths of the steel will often quench into a significant proportion of martensite (e.g., greater than 50% martensite), whereas deeper depths of the steel may quench into a significant proportion of pearlite or other material phases, with only a minority of the steel quenching into martensite (e.g., less than 50% martensite). The proportions of various material phases a steel quenches into is governed by the material's transition curve (referred to as a TTT curve). Martensite, specifically, is desirable for use in a rotor because it has very high yield strength and also very high hardness. A piece of steel is said to be through-hardened when at every thickness the steel contains at least 50% martensite.

In one embodiment, VAR 300M steel is used in the rotor because it is possible to through-harden the 300M steel to depths of 8-14 inches, making it very useful for forming a rotor of sufficient size to store a significant amount of kinetic energy. Particularly, the Si and V alloying elements in 300M delay the formation of pearlite during quenching in favor of the transition to martensite, resulting in increased through-hardness at significant depths within the steel. In a VAR 300M rotor, through-hardening allows the rotor to achieve a yield strength $\sigma_{yield}$ of up to 2 GPa.

Quenched steels have a drawback of having a low fracture toughness. Consequently, the quenching step can be followed by a tempering step. Tempering maintains the steel at a temperature lower than austenetizing temperature (e.g., 600-1200 Fahrenheit (F)) for a period of time (e.g., several hours) before cooling slowly back to room temperature. At the expense of some yield strength $\sigma_{yield}$, tempering significantly improves fracture toughness, and eliminates residual internal stresses. In a VAR 300M rotor, tempering allows the rotor to achieve a fracture toughness $\sigma_{fracture}$ of at least 70 MPa·m$^{0.5}$ while also maintaining a $\sigma_{yield}$ of over 900 MPa.

Surface treatments protect the surface of the rotor. Several different surface treatments may be used. A first is shot peening, where compressive stress is imparted to the surface of the rotor to harden it. A second is nitrogen and/or carbon treatments that similarly increase hardness as well as the yield strength of the rotor's surface. Other surface treatments may also be used.

One advantage of a rotor constructed as described above is that a significantly larger rotor, one capable of storing tens to hundreds of kWh of energy, can be manufactured at low cost relative to other potentially conceivable processes. Further, the total cost of a flywheel system incorporating such a rotor is also lowered relative to existing flywheel systems that use many smaller rotors. This is due to the fact that using a large rotor reduces the need for multiple rotors and their associated supporting elements. For example, it is much less expensive for a flywheel system to use a larger bearing to support a larger rotor versus using many smaller rotors each using their own smaller bearings. Further, a single monolithic rotor is also generally more economical than a rotor assembled from a stack of separate rotor components.

IV. Method of Manufacture

Figure 4:
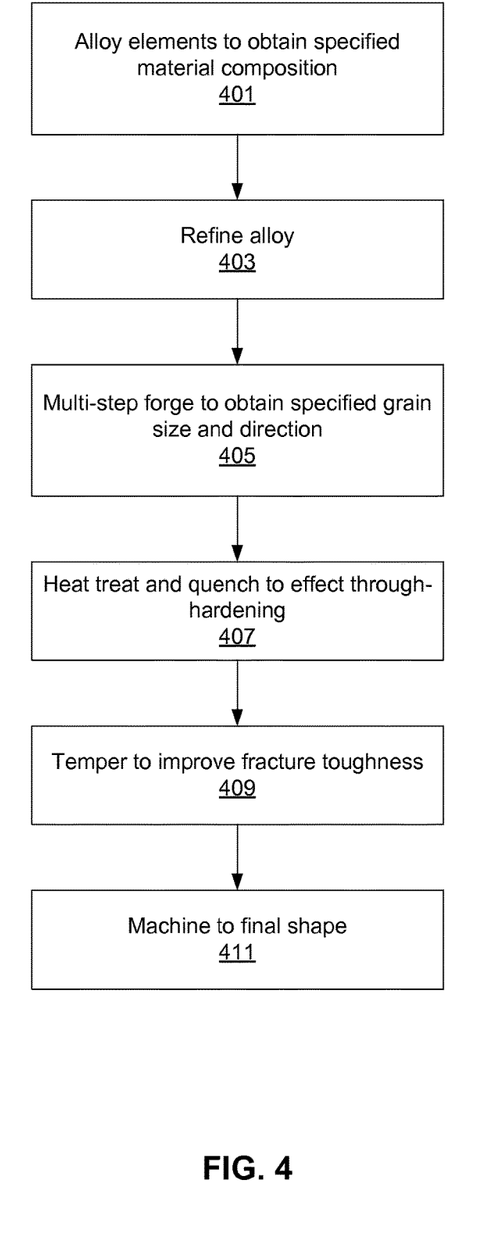
FIG. 4 is an exemplary process for manufacturing the flywheel rotor according to one embodiment.

FIG. 4 is an exemplary process for manufacturing a rotor according to one embodiment. In the example of FIG. 4, elements are alloyed 401 to manufacture steel with the desired material composition. For example, if 300M is to be used, Si, Cr, Ni, Mo, V, C, and Fe are alloyed together. The alloyed elements are then refined 403 to remove large defects. Continuing with the example above, the VAR process may be used to refine the 300M alloy. The refined alloy is then forged 405 to near net shape using a multi-step process to orient grain size and direction. A heat treatment is applied 407 to through-harden the forged rotor material to improve yield strength. Tempering 409 is then performed to improve fracture toughness. The rotor material may then be machined 411 to form the rotor into the desired shape.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An energy storage system comprising:
  a flywheel rotor comprising:
    a rotationally symmetric mass made of a single piece of steel, the rotationally symmetric mass having an outer diameter between 48 and 72 inches;
    two journals, each centered on a center axis of the mass and extending from opposite sides of the mass, each journal having a height parallel to the center axis of no more than two inches; and
    two stub shafts that are physically separate components than the mass, each stub shaft being substantially rotationally symmetric and being physically connected to one of the journals.

2. The energy storage system of claim 1 wherein each of the stub shafts comprises a connecting end that is wider in diameter than the corresponding journal, the connecting end of each stub shaft being between 4 and 10 inches in outer diameter.

3. The energy storage system of claim 1 wherein each of the stub shafts comprises a connecting end that is wider in diameter than the corresponding journal and is coupled to the corresponding journal with an interference fit.

4. The energy storage system of claim 3 wherein the interference fit comprises a diametric interference that is between 2 and 10 thousandths of an inch.

5. The energy storage system of claim 3 wherein the connecting end of each stub shaft is between 3 and 8 inches in inner diameter where it physically couples to the corresponding journal.

6. The energy storage system of claim 3 wherein each of the journals has an outer diameter of between 3 and 8 inches.

7. The energy storage system of claim 1 wherein each of the stub shafts comprises a connecting end that is wider in diameter than the corresponding journal and wider in diameter than a majority of a length of the stub shaft.

8. The energy storage system of claim 7 wherein the majority of the length of each stub shaft has a diameter of between 1 to 3 inches.

9. The energy storage system of claim 1 wherein a top surface of each journal is substantially planar, perpendicular to the polar axis of the mass.

10. The energy storage system of claim 1 wherein each journal protrudes between 0.5 to 2 inches along a longitudinal axis of the mass.

11. The energy storage system of claim 1 wherein each stub shaft is formed of a material has a yield stress between 500-1500 MPa.

12. The energy storage system of claim 1 wherein each stub shaft is made of a steel alloy.

13. The energy storage system of claim 1 wherein a length and a diameter of a majority of the length of each stub shaft is chosen to effect a bending stiffness, referred side loading at the end of the shaft, between 25 and 200 N/μm.

14. The energy storage system of claim 1 wherein a length and a diameter of a majority of the length of each stub shaft is chosen to effect a critical resonant mode of between 20 and 60 Hz, respectively, for the energy storage system.

15. The energy storage system of claim 1 wherein the energy storage system further comprises a rigid housing isolated from the earth by a footing.

16. The energy storage system of claim 1 wherein at least some portion of the mass is greater than 4 inches from an outer surface of the mass.

17. The energy storage system of claim 1 wherein the rotationally symmetric mass has a mass within a range of 3 to 5 tons.

18. The energy storage system of claim 1 wherein the mass is formed of vacuum-arc-remelted (VAR), through-hardened, and tempered 300M steel.

19. The energy storage system of claim 1, wherein the rotor has a yield strength in a range from 900 MPa to 2000 MPa, a fracture toughness in a range from 50 MPa·m$^{0.5}$ to 200 MPa·m$^{0.5}$, and a maximal intrinsic defect size that is 2 mm or smaller.

20. The energy storage system of claim 1, wherein each journal has an outer edge and a top surface that is substantially planar and perpendicular to the polar axis of the mass, and each of the stub shafts comprises a connecting end having an inner surface configured to engage with both the outer edge and the top surface of the corresponding journal.

21. The energy storage system of claim 1 wherein each stub shaft is physically connected to the corresponding journal with a shrink fit.

22. An energy storage system comprising:
a flywheel rotor comprising:
   a rotationally symmetric mass made of a single piece of steel, the rotationally symmetric mass has a mass within a range from 2 to 5 tons;
   two journals, each centered on a center axis of the mass and extending from opposite sides of the mass, each journal having a height parallel to the center axis of no more than two inches; and
   two stub shafts that are physically separate components than the mass, each stub shaft being substantially rotationally symmetric and being physically connected to one of the journals.

23. An energy storage system comprising:
a flywheel rotor comprising:
   a rotationally symmetric mass made of a single piece of vacuum-arc-remelted (VAR), through-hardened, and tempered 300M steel;
   two journals, each centered on a center axis of the mass and extending from opposite sides of the mass, each journal having a height parallel to the center axis of no more than two inches; and
   two stub shafts that are physically separate components than the mass, each stub shaft being substantially rotationally symmetric and being physically connected to one of the journals.

* * * * *